(12) United States Patent
Deutsch et al.

(10) Patent No.: US 7,693,523 B2
(45) Date of Patent: Apr. 6, 2010

(54) IMPLEMENTATION OF COLLABORATIVE TELECOMMUNICATIONS SERVICES

(75) Inventors: Douglas Anthony Deutsch, Naperville, IL (US); Bonnie P. Hitzeman, Winfield, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1519 days.

(21) Appl. No.: 11/005,966

(22) Filed: Dec. 7, 2004

(65) Prior Publication Data

US 2008/0008304 A1  Jan. 10, 2008

(51) Int. Cl.
  H04W 40/00 (2009.01)
  H04W 72/00 (2009.01)
  H04W 4/00 (2009.01)
  H04M 9/00 (2006.01)
  H04B 7/00 (2006.01)

(52) U.S. Cl. ............... 455/445; 455/401; 455/464; 455/466; 455/507; 455/509; 455/515

(58) Field of Classification Search ....... 455/3.05–3.06, 455/12.1, 13.2, 98, 158.1, 418–420, 400, 455/426.1–426.2, 427–431, 432.3, 434, 450–451, 455/452.1–452.2, 454–455, 464–466, 509, 455/511, 515–517, 550.1, 552.1, 553.1, 554.1–554.2, 455/555, 556.1, 560–561, 401, 416, 445, 455/457–458, 461, 507, 556.2, 414.1, 403; 709/203, 218–219, 221–222, 228–229, 231, 709/244–245; 370/310, 315, 322, 324–325, 370/328–329, 340–341, 348, 431–433, 437–439, 370/443, 266, 261–262, 312–313, 349, 395.2, 370/395.52, 395.53, 390, 904, 911–913; 379/201.01–201.03, 201.5, 201.12, 100.14, 379/142.04, 201.07–201.08, 205.01, 204.01, 379/202.01, 25, 308, 93.32

See application file for complete search history.

(56) References Cited

U.S. PATENT DOCUMENTS

| | | | | |
|---|---|---|---|---|
| 5,572,530 | A * | 11/1996 | Chitre et al. | 370/524 |
| 5,850,391 | A * | 12/1998 | Essigmann | 370/331 |
| 6,393,001 | B1 * | 5/2002 | Miyata | 370/316 |
| 7,398,294 | B2 * | 7/2008 | Florkey et al. | 709/204 |
| 2002/0006801 | A1 * | 1/2002 | Siren | 455/461 |

(Continued)

FOREIGN PATENT DOCUMENTS

WO  WO 2004/073288 A2 *  8/2004

*Primary Examiner*—Meless N Zewdu
(74) *Attorney, Agent, or Firm*—Werner Ulrich

(57) ABSTRACT

This invention relates to methods and apparatus for establishing the flexible connections required to serve collaborative Telestar service requests. Telestar refers to services frequently described as being Tele* services such as teleeducation, teleconsultation and telemedicine. A customer node, such as a doctor's office, is connected via a high speed link to a switch which in turn is connected to a broadband network for interconnecting high speed links. The broadband network is connected to a Telestar service provider node. The customer signals requests for connections within the Telestar service provider nodes. These requests are processed by a Tele* service controller to generate request messages to the source and destination nodes to establish a requested connection. Advantageously, the highly flexible arrangements needed for providing optimum Telestar service can be readily controlled by a calling customer.

19 Claims, 4 Drawing Sheets

U.S. PATENT DOCUMENTS

| | | | |
|---|---|---|---|
| 2002/0058478 A1* | 5/2002 | de La Chapelle et al. | 455/13.4 |
| 2002/0075304 A1* | 6/2002 | Thompson et al. | 345/751 |
| 2002/0141357 A1* | 10/2002 | Park et al. | 370/328 |
| 2002/0176378 A1* | 11/2002 | Hamilton et al. | 370/328 |
| 2003/0086423 A1* | 5/2003 | Hsu | 370/390 |
| 2004/0015415 A1* | 1/2004 | Cofino et al. | 705/26 |

* cited by examiner

IMPLEMENTATION OF COLLABORATIVE TELECOMMUNICATIONS SERVICES

TECHNICAL FIELD

This invention relates to communications for high speed Telestar (e.g., teleconsultation, telemedicine, teleeducation) services.

BACKGROUND OF THE INVENTION

Tele* (Telestar) services such as teleeducation, teleconsultation, and telemedicine are becoming increasingly popular and prevalent. These services typically are provided from a teleservice provider connected to a customer via a data facility. The most common type of data facility for such a connection is an integrated services digital network (ISDN) connection which includes both a signaling channel and one or two 64 kilobit bearer channels. In addition, there are various arrangements for using the ISDN/SS7 signaling arrangements with a broadband data bearer channel.

However, the demands of Telestar services are significantly more elaborate. One such user of telemedicine is a large hospital complex having many departments, each of which can have a plurality of doctors' offices and/or laboratories. A call to the hospital may involve connections, for example, to the oncology department, the x-ray department and the hospital archive. Additionally, service delivery includes organizations not associated with the hospital such as a pharmacy (e.g., Walgreens), insurance providers, etc. that must be consulted during patient treatment. A problem of the prior art is that there is no satisfactory arrangement for efficiently automating the collaboration and consultation for information exchange during multi-party service delivery transactions.

SUMMARY OF THE INVENTION

The above problem is solved and an advance over the prior art is made in accordance with this invention wherein a stored program controlled computer with a subscriber/collaborator database containing the relationships needed to add and delete parties (machines or people) as indicated by the service logic and/or input from the collaborating parties, controls establishment of connections in response to requests from one or more parties. A Telestar service collaboration management is the service logic/process logic to control collaborative/converged interaction required to complete a service delivery from service initiation through final charge settlement. For Telestar services, the signaling arrangements are enhanced with a Telestar application layer for communications among a plurality of intelligent customer nodes; these nodes generate Telestar application layer (TAL) messages to other intelligent customer nodes and route incoming messages to particular terminals in response to received Telestar application layer messages. The intelligent customer nodes generate signaling messages for establishing connections among the customer nodes involved in a particular call configuration of an application. Thus, bearer channel messages are assembled and multiplexed at a source intelligent customer node or intelligent network node, are sent under the control of signaling messages to a destination intelligent customer node, and are demultiplexed and appropriately distributed by the destination intelligent network or customer node. Advantageously, through the use of the Telestar service controller the establishment and alteration of connections for Telestar services is streamlined and the control by the service provider is simplified.

The arrangement in accordance with Applicants' invention is one for permitting extensive collaboration among a plurality of parties and for permitting these parties to have access to databases and data destinations for accomplishing specific purposes. The potential end devices include (but are not limited to) conventional wire telephones, computers, PDAs, cell phones, and other wireless and wireline communication devices for voice, data or imaging exchanges. The imaging exchanges can cover a wide range of applications. Two examples include diagnostic imaging for medical MRIs, and field diagnostics for diagnosing automobile problems by consulting with a specialized mechanic for hard to diagnose auto repairs.

The collaborations of Telestar services can be used by institutions such as schools (to allow a plurality of remotely located students to have both incoming and outgoing video and audio access to a centralized lecture location); governments (to allow different government departments to access each other and to access the databases and data destinations required for acquiring information and for accomplishing objectives such as writing checks or sending bills to constituents); real estate transactions (to allow documents for closings to be obtained and to transfer funds for completing a sale); corporate meetings (to allow individuals or groups to be added or deleted from a meeting, to allow databases to be accessed and to allow data destinations to be accessed for the purpose of ordering checks to be transmitted and/or bills to be sent).

An additional capability of remote viewing capability can be provided by Telestar and be of benefit to industries such as the real estate industry. Instead of driving clients from house to house to view houses, an agent could set up a remote home tour at the real estate office or the client could connect into the service from their home location. By reducing the need to drive, the remote viewing has a side benefit of lessening the demand for natural resources such as oil and lessens road congestion.

The Telestar application can also benefit existing services such as OnStar currently installed in vehicles. The enhancement Telestar brings is that it can provide video of traffic intersections to help guide the driver around congestion and accident areas.

In the case of medical applications, the Telestar application makes it possible for individual doctors to make inventory checks for drug availability and eligibility; to order prescriptions that are electronically transmitted to a pharmacy; to make arrangements for automatic reimbursement by permitting the doctor to send a description of services to a medical database which database then sends a request for reimbursement to insurance companies and a request for reimbursement to a patient. Remote house calls are made possible by having a patient previously connected with equipment that can be connected for measuring specific patient physiological measurements (such as blood pressure, pulse, breathing rate) and for automatically distributing such measurements to a primary physician and a consultant brought in by the primary physician.

This collection of services can all be implemented through data stored in the Telestar controller executed by the Telestar application, augmented by data provided by patients, doctors, teachers etc. to specify particular consultants or users of the service wherein the controller controls the establishment of connections and where appropriate transmits data messages to one or more parties of such connections to provide these parties with the data necessary for identifying the purpose and parties to the connection.

BRIEF DESCRIPTION OF THE DRAWING(S)

DETAILED DESCRIPTION

Figure 1:
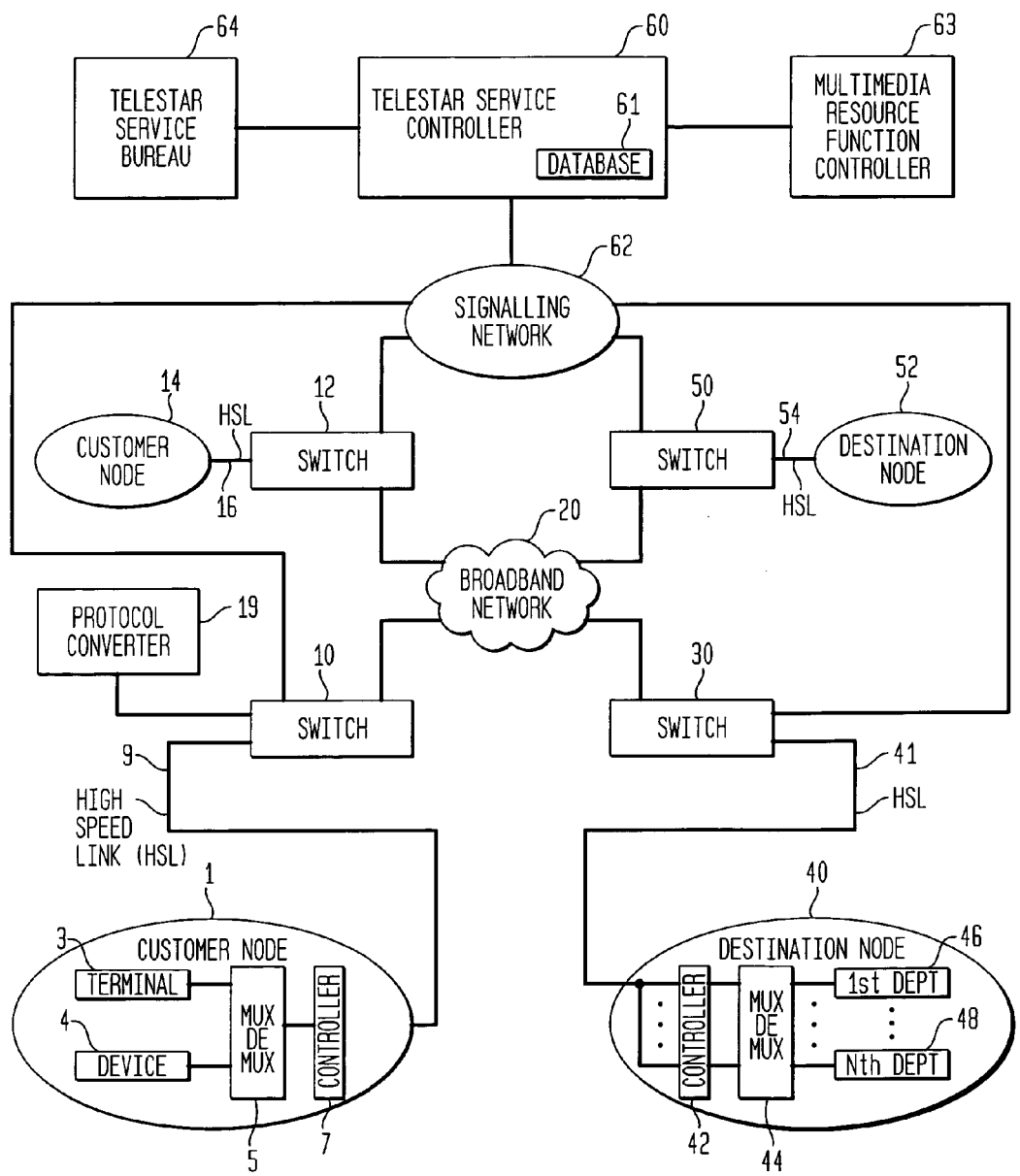
FIG. 1 is a block diagram illustrating Applicants' invention.

FIG. 1 is a block diagram illustrating the operation of Applicant's invention. A customer 1 is connected to a local switch 10 such as the 5E-XC® Or a Mobility Switching Center such as the FMM (Flexibility Mobility Manager) with the FPS (Flexent Packet Switch), both designed and developed by Lucent Technologies Inc., by a high speed data link 9. An example of such a high speed data link for connecting the customer to the switch is a digital subscriber line (DSL) facility or 3G1x, EVDO, T1 or OC-3, WiFI or WiMax. A customer connected to such a facility specifies the service (e.g. Voice, video, hifi audio, etc.) required and the destination identification (usually a telephone number). The request for services is sent to a Telestar service controller 60. The Telestar service controller establishes connections on behalf of the service originator with the required bandwidth. The service controller can be an element in an existing wireline or wireless network including Lucent's IMS (IP multimedia Core Network Subsystem which utilizes the Lucent softswitch) architecture. Since IMS is access type agnostic and covers wireline and wireless, it can be an ideal architecture for the Telestar deployment.

A Telestar service controller 60 which receives the service request messages from the customer, contains a database 61 of subscriber information necessary to implement the Telestar services, and is connected through a signaling network 62 with the various switches required to implement the Telestar services. The Telestar service controller is connected to a service bureau 64 which transmits messages to update the database 61 as new services and customers are added and existing customer information is deleted.

The Telestar controller receives requests messages from nodes connected to the network. The controller has a repertory of text messages and signaling messages to control the establishment or disconnection of nodes in response both to an initial request and intermediate requests received during the course of a session. For example, an initial request may be for a connection from an x-ray laboratory to a radiologist. The request message may include the identity of the patient whose x-ray is being transmitted. The radiologist can make a request for a consultation which is preceded by the forwarding of the digitized x-ray to the consulted party, followed by the establishment of a connection between the original radiologist and the consultant. Both the original radiologist and the consultant can transfer fee requests to an insurance database. The radiologist may also request establishment of a connection to the responsible physician to discuss conclusions based on the analysis of the x-rays.

The database of the Telestar controller contains information for signaling for the establishment of a connection to the primary physician, the consultant, and initially the radiologist. Each of these parties is identified by a key specified by the individual requesting the connection. The type of connection (e.g., bandwidth) is also specified in the connection request or is indicated by a default value stored in the Telestar controller.

The Telestar controller is also able to control the establishment of multipoint connections so that either a conference (any individual can talk) or a broadcast (only one individual can talk) depending on the type of connection requested. Telestar can issue commands via third party call control to a subscribing network. Telestar can initiate a call to a service bureau that is automated and contains network entities required to deliver a service. (This acts like a browser of telecom and info services much as a webbrowser and service browses the web today.)

In addition, the service bureau can be customized with personal information such as insurance coverage, doctors, attorneys, etc. This can be done as simply as a conference call on the current 5E-XC, FMM (Flexibility Mobility Manager) or the FPS (Flexibility Packet Switch) or through the telephone application server in the IMS architecture. Telestar services can be offered by a service bureau or as a vertical service by a service provider. The personal information can be keyed by an originating telephone number or static IP address for automatic service presentation. The information can also be keyed by a User ID so user service can be device independent.

A user can dial a Telestar (medical or other) application number, much like dialing up customer support for a health care provider, at which point the user can choose a service from a menu. Telestar detects calling party number and begins a medical script:

"Press 1 for your Primary care Physician representative

Press 2 to schedule an appointment

Press 3 for preferred Pharmacy. (for refill, et. al)."

Customer press 1

Telestar sends mid call trigger (e.g., AIN type trigger) to conference PCP-Number stored in Telestar medical database, triggered by calling party number.

Telestar monitors the call events, and if additional commands specify the inclusion or removal of resources, Telestar can signal to the underlying data or telecom network to add or drop parties, transfer data between parties, etc.

In response to signaling messages from the Telestar service controller 60, a connection is established from the local switch connected to the customer over a broadband network 20 (such as a suitably augmented public switched telephone network or a network comprising a plurality of interconnected Asynchronous Transport Mode (ATM) nodes) or IP, SIP or any devices adhering to the 802 standard series which includes Ethernet, Wifi and WiMax to reach a destination. In order to do so, a protocol conversion device, such as protocol converter 19, shown in this case, as attached to the switch 10, may need to be introduced into the connection.

The destination in the example of FIG. 1 is a Telestar provider housed in a destination node 40. The customer 1 can, for example, be a doctor's office and the destination can be a hospital or university having a plurality of individual destinations such as an x-ray department, a cardiology department etc.

The customer node is provided with controller 7 for accessing the high speed link to the local switch and the Telestar service controller, who is also provided with a similar interface.

The controller must provide the following functions:

1. Facilities to transmit a called telephone number or IP address or a voice activated command and generally a calling number for caller identification as signaling information transmitted over a Telestar layer of the protocol stack for messages from the controller.

2. A display monitor to allow for a satisfactory interface with the user of the interface.

3. A personal computer (or PDA etc.) to generate control messages and to extract information from received messages for display on the monitor.

The customer node also contains a modem and multiplexer/demultiplexer 5 for generating the outgoing data stream from a plurality of inputs and for routing the incoming data stream to a plurality of outputs. The customer is provided with a terminal 3 for generating control information to the controller 7 to request the controller to establish the desired connections. The customer node may also be provided with a device 4 such as a heart monitor to generate signals for transmission to the destination node. Such capabilities point out the ability for this service to provide the equivalent of "remote house calls" by providing collaboration of the patient in a remote area and a doctor in an urban medical facility.

The switch 10 is arranged to switch signals between the high speed link 9 and the broadband network 20. The switch 10 can demultiplex incoming signals so that it sends different signals on different channels to the broadband network. The application layer signaling information controls multiplexing to different destinations based on address. These addresses could go to a WAN, LAN or wireline or wireless network. For example, in the case of DSL, the data signal is split off with a DSLAM, thus routing the data to a data server, not the local 5E-XC switch.

The broadband network 20 switches high speed data among the connected switches 10, 12, 30 and 50. An example of such a network is the AOL or MCI data network.

The broadband network is connected to switch 30 which is connected via high speed link 41 to a destination node 40. The destination node, for example, is a node for serving a hospital. The destination node 40 contains a controller 42 for controlling the communications from and to the destination node. It also contains a modem and multiplexer/demultiplexer 44 for interfacing between the signals on a high speed bearer channel from switch 30 to the signals to various departments (46, . . . , 48) of the destination node.

FIG. 1 also shows a second customer node 14 connected via high speed link 16 to another switch 12 and a separate destination node 52 connected via high speed link 54 to switch 50.

In one example of the embodiment, the messages for implementing Applicants' invention are sent using the ISDN subscriber user protocol (ISUP).

The level 1 of the protocol is simply the DS1 transmission protocol, i.e., the physical layer dealing with hardware and electrical configs.

Level 2 is an MTP1 protocol such as ATM, and the user part. It monitors links and reports link status, checks message for integrity, etc. For example, signal unit error detection and flow control are done at layer 2.

Level 3 is an MTP2 protocol such as AAL5 (ATM Adaptation Layer 5). MTP Level 3 has 2 categories one is message routing and the other is signaling network management. For example signaling link changeover of removing bad links and moving traffic to another link is at the layer 3.

Level 4 using a protocol such as SSCOP. The SSCOP is the Signaling Connection Control Part.

Level 5 uses a protocol such as SSCF. SSCF is Service Specific Convergence Function layer. SCCP is signaling connection control part which provides specialized routing functions Next is information in the ISUP (ISDN service user part) protocol. Finally, the information for the Telestar service is contained in the next level.

TCAP, the Transactions Capabilities application part, is to allow applications to exchange information using signaling that is not circuit related. TCAP is used, for example, to obtain data from a database such as a dip for an 800 call or the HLR in mobile calls, etc.

Other message protocols can be used for transmitting request, command and connect messages.

An example of the type of messages used for implementing Telestar service is an initial address message (from ISUP) which contains the following data: forward call indicators which can be used to convey information that the sending exchange has further call information available for end to end transmission; an ISDN user part indicator can be used to indicate whether or not the access signaling protocol is ISDN and whether the ISDN user part is used in the entire connection; two bits (g and h) can be used to indicate whether the ISDN user part is preferred or required; another bit, bit i, the ISDN access indicator, can be used to indicate whether or not the originating access is ISDN.

The calling party category can be used for sending information in the forward direction including the category of the calling party and the language spoken and the priority of the call. This information in particular the language spoken indicator can be used to select an appropriate terminating party.

The transmission medium requirement indicator indicates the type of transmission path required to complete the call. Examples would be speech, 64 kilobit unrestricted, or 7 kilohertz audio, or 1536 kilobits unrestricted.

The called party address is information sent in the forward direction such as dialed digits number plan indicator. This information can be used for Telestar service to indicate what numbering plan this call will use, e.g., a data numbering plan or an ISDN numbering plan.

However, the originator is not limited to the numbering plan. Telestar will perform the address resolution. For example, an IP address connected to a computer can call a landline phone. The destination can be an address, on the web, from the E164 North American Dialing plan or a URL on the web.

The calling party number can be used to identify the calling line to the called party and the Telestar service controller. Alternatively, the user could have a PIN and dial in so they can originate from anywhere, any phone, any PC, PDA, etc.

A redirecting number used for call forwarding can be provided by the Telestar service controller to forward the call properly in case the called party has requested call forwarding. In this case, the original called number can be provided to the called party.

Another type of message which illustrates the facilities made available for Telestar service is an ACM (Answer Complete Message), i.e., a message sent from the terminator to the originator to indicate that the signals required for routing the call to the called party have been received. Such a message can include a backward call indicator which could include a charge indicator that would indicate whether or not the called party will be charged for this call. For example, if consulting a specialist via phone call, this can indicate a bill for consultation; such a bill could automatically be forwarded to an insurance company.

In accordance with one feature of Applicants' invention, service delivery for multi-party interactions/transactions can be streamed. Individual or groups of service delivery resources can be added or removed asynchronously during the service transaction.

Figure 2:
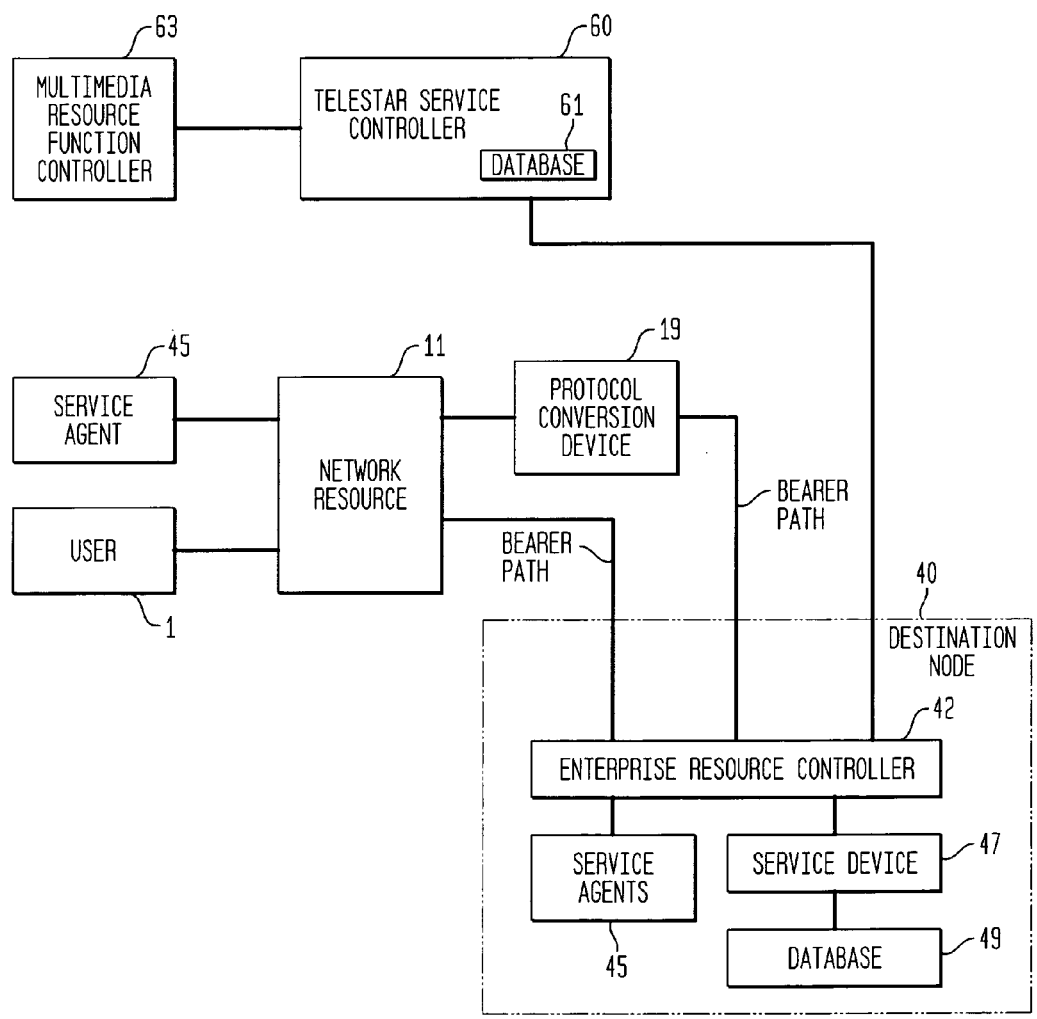
FIG. 2 is a high level block diagram showing interconnections of Applicants' invention.

FIG. 2 is a high level block diagram showing interconnections among certain blocks of the elements of FIG. 1. The Telestar service controller 60 is connected to a Multi-media Resource Function Controller 63. This Controller provides voice over IP functions including announcement playback, collection of DTMF (Dual Tone Multifrequency) digits, tone generation and conferencing. For example, if a physician needs to examine an x-ray, a channel of proper bandwidth needs to be assigned to convey the x-ray image from a repository to that physician. The more complex destination nodes 40, such as those serving a hospital, include an Enterprise Resource Controller 42 to route communications from and to service agents 45 and service devices (e.g., display units) 47. The service devices can be connected to a data store 49.

The network resource 11 is a more general term for a network interconnection facility such as a land-line switch, mobile switch, mobile base station or a combination of such units. The network resource is a unit for interconnecting users or service agents with the Telestar service controller 60, via a signaling path, or other users or service agents (not shown) as well as an enterprise resource controller 42. The network resource may require the use of a protocol conversion device 19 to allow for communication between units where such conversion is necessary.

Figure 3:
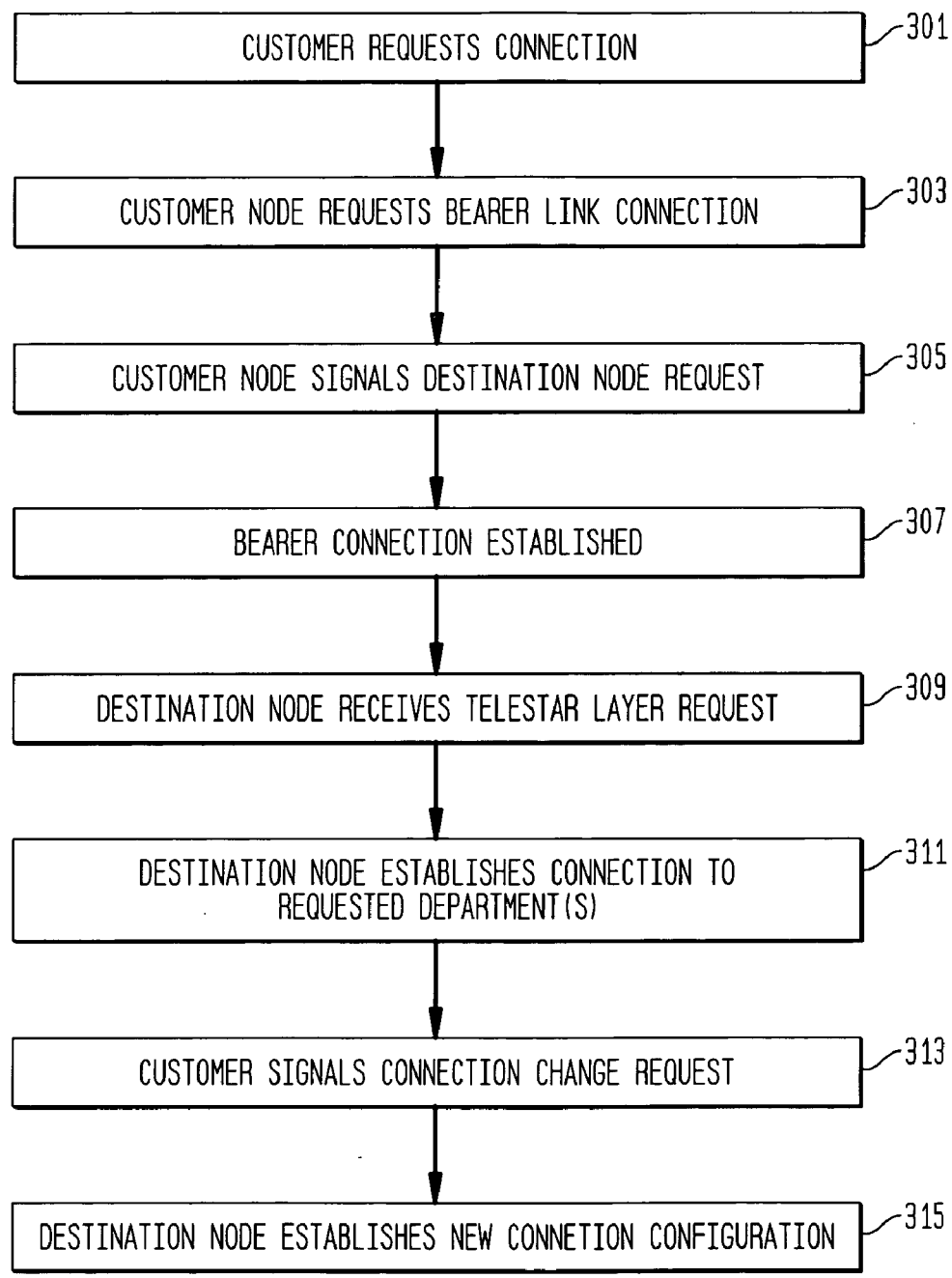
FIG. 3 is a flow diagram illustrating the processing of Telestar requests.

FIG. 3 is a flow diagram illustrating the operation of Applicants' invention. A customer requests a connection (action block 301). In this case, the customer is at terminal 3 within customer node 1. The customer's request is transmitted to controller 7. The customer node requests a bearer link connection (action block 303) via a Signaling System 7 (SS7) request.

This customer node request is generated by the controller 7. The customer node signals a destination node request (action block 305) to inform the destination node of which signals on the bearer channel are to be connected to which departments in the destination node. The bearer connection is then established (action block 307). The destination node receives the Telestar layer request describing which of the customer node signals are to be routed to which departments (action block 309). The destination node then establishes the connection to the requested connection to the requested department(s) (action block 311). The customer may subsequently signal a connection change request as another Telestar layer message (action block 313). The destination node then establishes a new configuration in response to the received request (action block 315).

Figure 4:
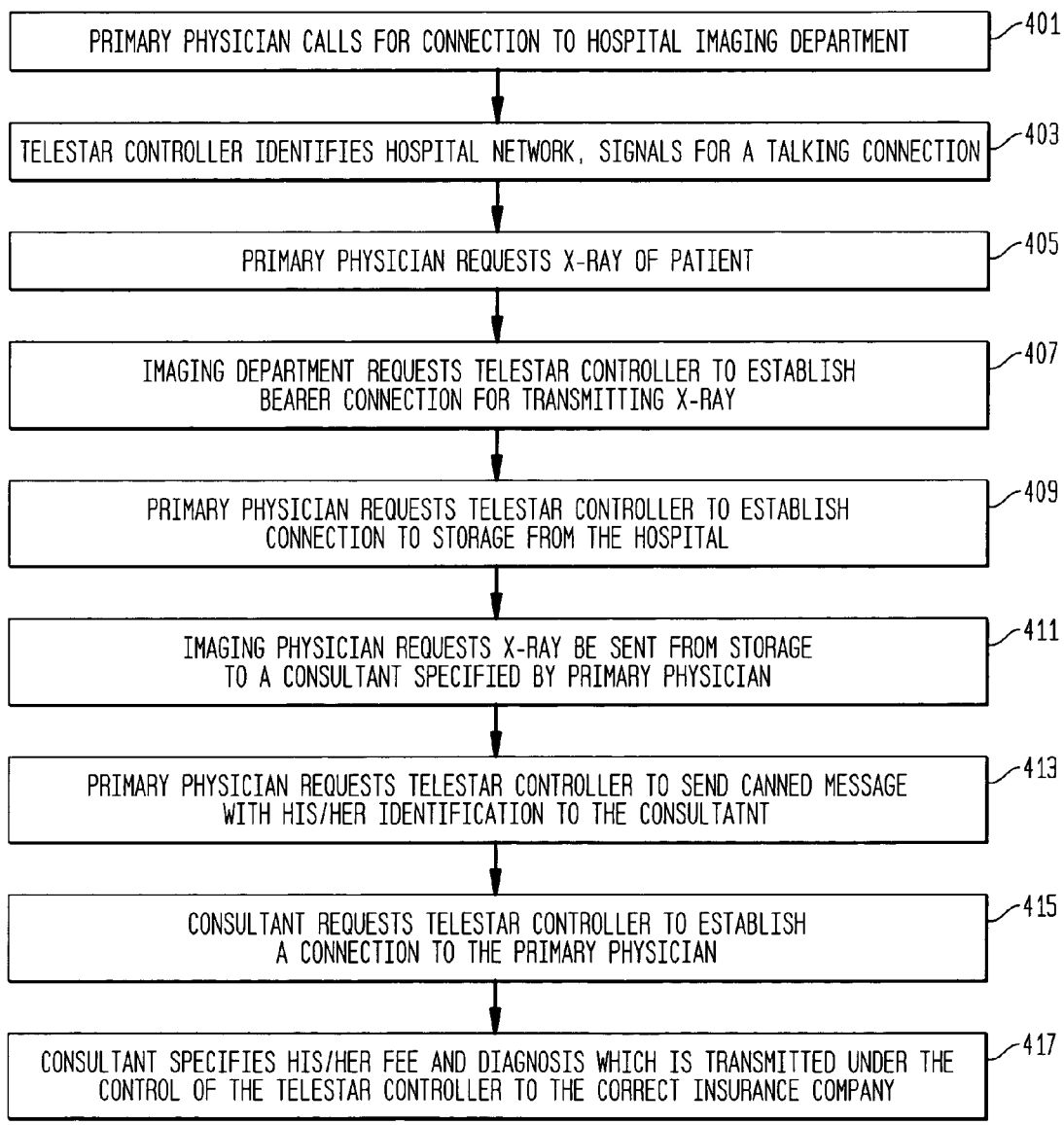
FIG. 4 is a scenario of a Telestar session.

FIG. 4 is a scenario of a Telestar session. A primary physician calls for a connection to a hospital imaging department, specifying the hospital and a key indicating imaging (action block 401). The Telestar controller identifies the hospital network, sends signaling information to the network to set up a talking connection between the primary physician and the imaging department (action block 403). The primary physician and the imaging department talk and the primary physician requests an x-ray for a patient identified by him (action block 405). The imaging department requests the Telestar controller to establish a bearer connection having adequate bandwidth for transmitting the x-ray (action block 407). The primary physician requests the Telestar controller to establish a connection to storage from the hospital in order to temporarily store the x-rays (action block 409). The imaging physician requests that the x-ray be sent from storage to a consultant specified by the primary physician (action block 411). The primary physician requests the Telestar controller to send a canned message with his identification to the consultant (action block 413). The consultant requests the Telestar controller to establish a connection to the primary physician (action block 415). The consultant specifies his/her fee which is transmitted, under the control of the Telestar controller to the correct insurance company and/or Medicare (action block 417).

In the case of the medical application, the prescription can be automatically forwarded to the pharmacist of the patient.

Remote house calls can be implemented by connecting the physician first to the patient, then adding on, as needed, a connection to a hospital or a specialist, and accessing data from a data bank of the hospital.

Entertainment requests can be received by the Telestar Service Controller which can store data for responding to the requests. An example of such data is a list of films by a particular directory, and the service nodes which can transmit these films. Data for sports events or live entertainment can also be stored.

Remote repair and diagnostic service can be implemented using a portable data acquisition unit, such as collection of meters and a digital camera, and sending a signal, probably via a wireless connection, to a repair bureau, staffed by experts.

The above description is of one preferred embodiment of Applicants' invention. Other embodiments will be apparent to those of ordinary skill in the art without departing from the scope of the invention. The invention is limited only by the attached claims.

We claim:

1. A method for providing high speed collaborative Telestar service comprising the steps of:
    implementing a Telestar application layer in a signaling system;
    in a source intelligent customer node, responsive to receipt of request from a customer, generating signaling messages for requesting a bearer connection to a at least one destination intelligent customer node for carrying out a requested function;
    in said source intelligent customer node, generating Telestar application originating messages to indicate destinations of ones of a plurality of data streams of said bearer channel transmitted from the source intelligent customer node for carrying out said requested function;
    transmitting said Telestar application messages to a Telestar Service Controller;
    processing said Telestar application originating messages in said Telestar Service Controller to generate Telestar application terminating messages for transmission to said destination intelligent customer node and to said source intelligent customer node to carry out said selected function;
    in the source and destination intelligent customer nodes, responsive to receipt of said terminating Telestar messages, controlling establishment of a connection from the source intelligent customer node to the selected destination intelligent customer node.

2. The method of claim 1 further comprising the step of:
    in the destination intelligent customer node, demultiplexing said bearer channel and routing individual ones of said plurality of data streams to destinations within the destination intelligent customer node specified in the Telestar application layer messages.

3. The method of claim 1 wherein said Telestar service is a telemedicine service;
wherein said source and destination intelligent customer nodes are for connection to a medical measurement device and/or a doctor or medical specialist.

4. The method of claim 3 further comprising the step of:
establishing a connection from a medical professional or technician to an inventory database for drug availability and eligibility of a patient for a drug.

5. The method of claim 3 further comprising the step of:
a medical technician or professional ordering the filling of a prescription by sending an appropriate message to a pharmacy.

6. The method of claim 3 further comprising the step of:
sending information from a medical professional or technician to a billing database to initiate reimbursement from a patient or an insurance company or a government agency for a medical service rendered.

7. The method of claim 3 further comprising the step of:
retrieving data for living wills or powers of attorney from a database.

8. The method of claim 3 further comprising the step of:
accessing data in a database of said destination intelligent customer node.

9. The method of claim 1, wherein said Telestar service is an educational service, further comprising the steps of:
establishing a previously prescribed conference connection among a plurality of student terminals and a main teaching location.

10. The method of claim 1, wherein said Telestar service is a real estate service, further comprising the steps of:
automatically interconnecting previously specified real estate agents and customers; and
transmitting recordable signatures for closing documents.

11. The method of claim 1, wherein said Telestar service is a banking service, further comprising the steps of:
verifying an identity of said customer;
responsive to receipt of signals from the customer, transferring funds to a destination specified by said signals.

12. The method of claim 1 wherein said Telestar service is an entertainment provision service, further comprising the step of:
said Telestar Service Controller storing customer entertainment profile data; and
responsive to receipt of an indication from said source intelligent customer node, establishing a connection to a selected service provider at a destination intelligent customer node for providing an entertainment signal to said source intelligent customer node.

13. The method of claim 1 wherein said connections include wireless connections.

14. The method of claim 1 wherein said connections include Internet connections.

15. The method of claim 1 wherein said connections include multimedia connections.

16. The method of claim 1 wherein said connections include broadband network connections.

17. The method of claim 1 wherein said Telestar service is a repair diagnostic service, further comprising the steps of:
establishing an image transmission connection and a voice connection from a portable source intelligent customer node to a service bureau;
wherein a specialist at said service bureau provides guidance to a repair person at said portable node.

18. The method of claim 17 wherein said portable source intelligent customer node is connected by a wireless network resource.

19. The method of claim 1 further comprising the steps of:
automating service delivery by streaming multi-party interactions/transaction; and
automating adding and removing service delivery resources asynchronously during a service transaction.

* * * * *